US012591530B2

(12) United States Patent
Kachare et al.

(10) Patent No.: US 12,591,530 B2
(45) Date of Patent: Mar. 31, 2026

(54) SYSTEMS AND METHODS FOR A CACHE-COHERENT INTERCONNECT PROTOCOL STORAGE DEVICE

(71) Applicant: Samsung Electronics Co., Ltd., Suwon-si (KR)

(72) Inventors: Ramdas P. Kachare, Pleasanton, CA (US); Jimmy Lau, Santa Clara, CA (US); Amir Beygi, San Jose, CA (US); Mohammadreza Soltaniyeh, Sunnyvale, CA (US); Tinh Lac, Manteca, CA (US); Divya Subbanna, San Jose, CA (US); Mostafa Aghaee, San Jose, CA (US); Dongwan Zhao, San Jose, CA (US); William Tien, San Jose, CA (US); Varadraj Ninad Sinai Kakodkar, San Jose, CA (US); Luis Vitorio Cargnini, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 11 days.

(21) Appl. No.: 18/513,496

(22) Filed: Nov. 17, 2023

(65) Prior Publication Data
US 2024/0311318 A1 Sep. 19, 2024

Related U.S. Application Data

(60) Provisional application No. 63/452,159, filed on Mar. 14, 2023.

(51) Int. Cl.
*G06F 13/40* (2006.01)
*G06F 13/16* (2006.01)
*G06F 13/42* (2006.01)

(52) U.S. Cl.
CPC ........ *G06F 13/1694* (2013.01); *G06F 13/404* (2013.01); *G06F 13/4221* (2013.01)

(58) Field of Classification Search
CPC . G06F 13/1694; G06F 13/404; G06F 13/4221
(Continued)

(56) References Cited

U.S. PATENT DOCUMENTS 8,880,777 B2 * 11/2014 Kim .................... G06F 12/0246
711/E12.008
8,935,493 B1 1/2015 Dolan et al.
(Continued)

FOREIGN PATENT DOCUMENTS

CN 106843772 A 6/2017
EP 4154121 A1 3/2023
(Continued)

OTHER PUBLICATIONS

European Extended Search Report for Application No. 24160253.1, mailed Jul. 22, 2024.
(Continued)

*Primary Examiner* — Christopher B Shin
(74) *Attorney, Agent, or Firm* — Renaissance IP Law Group LLP

(57) ABSTRACT

A device is disclosed. An interface may connect the device to a processor. The interface may support a first protocol. A first storage and a second storage may the data. The second storage may support a second protocol different from the first protocol. A controller may be connected to the interface and the first storage. A bridge may be connected to the interface, the first storage, and the second storage. The bridge may include a filter configured to coordinate a data transfer between the first storage and the second storage.

18 Claims, 11 Drawing Sheets

(58) Field of Classification Search
USPC ........................................................ 710/313
See application file for complete search history.

(56) References Cited

U.S. PATENT DOCUMENTS

| | | | |
|---|---|---|---|
| 9,135,173 | B2 | 9/2015 | Benhase et al. |
| 9,311,230 | B2 | 4/2016 | Fitch et al. |
| 9,459,809 | B1 | 10/2016 | Chen et al. |
| 10,176,212 | B1 | 1/2019 | Prohofsky |
| 10,635,598 | B2 | 4/2020 | Veal et al. |
| 10,678,760 | B2 | 6/2020 | Marwah et al. |
| 10,769,098 | B2 | 9/2020 | Joshua et al. |
| 10,929,291 | B2 | 2/2021 | Jung et al. |
| 10,929,309 | B2 | 2/2021 | Benisty et al. |
| 11,079,951 | B2 | 8/2021 | Patel et al. |
| 11,200,005 | B2 | 12/2021 | Patel et al. |
| 11,334,274 | B2 | 5/2022 | Kabra et al. |
| 11,347,699 | B2 | 5/2022 | Carpenter et al. |
| 11,392,499 | B2 | 7/2022 | Das et al. |
| 11,561,909 | B2 | 1/2023 | Hahn et al. |
| 11,599,472 | B1 | 3/2023 | Isenegger et al. |
| 11,669,260 | B2 | 6/2023 | Mittal et al. |
| 12,056,066 | B2 * | 8/2024 | Lee ..................... G06F 13/1668 |
| 2006/0248124 | A1 | 11/2006 | Petev et al. |
| 2015/0006787 | A1 | 1/2015 | Liu et al. |
| 2019/0034353 | A1 | 1/2019 | Liem et al. |
| 2019/0166172 | A1 | 5/2019 | Kurian et al. |
| 2019/0272240 | A1 * | 9/2019 | Kachare .............. G06F 13/4282 |
| 2019/0272242 | A1 * | 9/2019 | Kachare .............. G06F 13/4282 |
| 2020/0019336 | A1 | 1/2020 | Kachare et al. |
| 2020/0104275 | A1 | 4/2020 | Sen et al. |
| 2020/0117397 | A1 | 4/2020 | Li et al. |
| 2020/0183582 | A1 * | 6/2020 | Kachare .................. G06F 9/544 |
| 2020/0379926 | A1 | 12/2020 | Gopalakrishnan |
| 2021/0117427 | A1 | 4/2021 | Xiang |
| 2021/0390053 | A1 | 12/2021 | Roberts |
| 2022/0004668 | A1 | 1/2022 | Dewan et al. |
| 2022/0350747 | A1 | 11/2022 | Hahn et al. |
| 2022/0358041 | A1 | 11/2022 | Vijayrao et al. |
| 2023/0052700 | A1 | 2/2023 | Clark et al. |
| 2023/0062610 | A1 * | 3/2023 | Gim ..................... G06F 13/1668 |
| 2023/0205449 | A1 * | 6/2023 | Jeong ..................... G06F 3/0679 711/118 |
| 2023/0236742 | A1 * | 7/2023 | Sehgal .................. G06F 3/0679 711/154 |

FOREIGN PATENT DOCUMENTS

| | | | |
|---|---|---|---|
| WO | 2021236800 | A1 | 11/2021 |
| WO | 2023022776 | A1 | 2/2023 |

OTHER PUBLICATIONS

Jung, Myoungsoo, "Hello Bytes, Bye Blocks: PCle Storage Meets Compute Express Link for Memory Expansion (CXL-SSD)," Proceedings of the 14th ACM Workshop on Hot Topics in Storage and File Systems, Jun. 2022, pp. 45-51.

European Extended Search Report for Application No. 24212094.7, mailed Mar. 26, 2025.

European Office Action for Application No. 24160253.1, mailed Mar. 10, 2025.

Office Action for U.S. Appl. No. 18/515,218, mailed Apr. 23, 2025.

Notice of Allowance for U.S. Appl. No. 18/515,218, mailed Sep. 30, 2025.

European Office Action for Application No. 24212094.7, mailed Aug. 20, 2025.

* cited by examiner

705

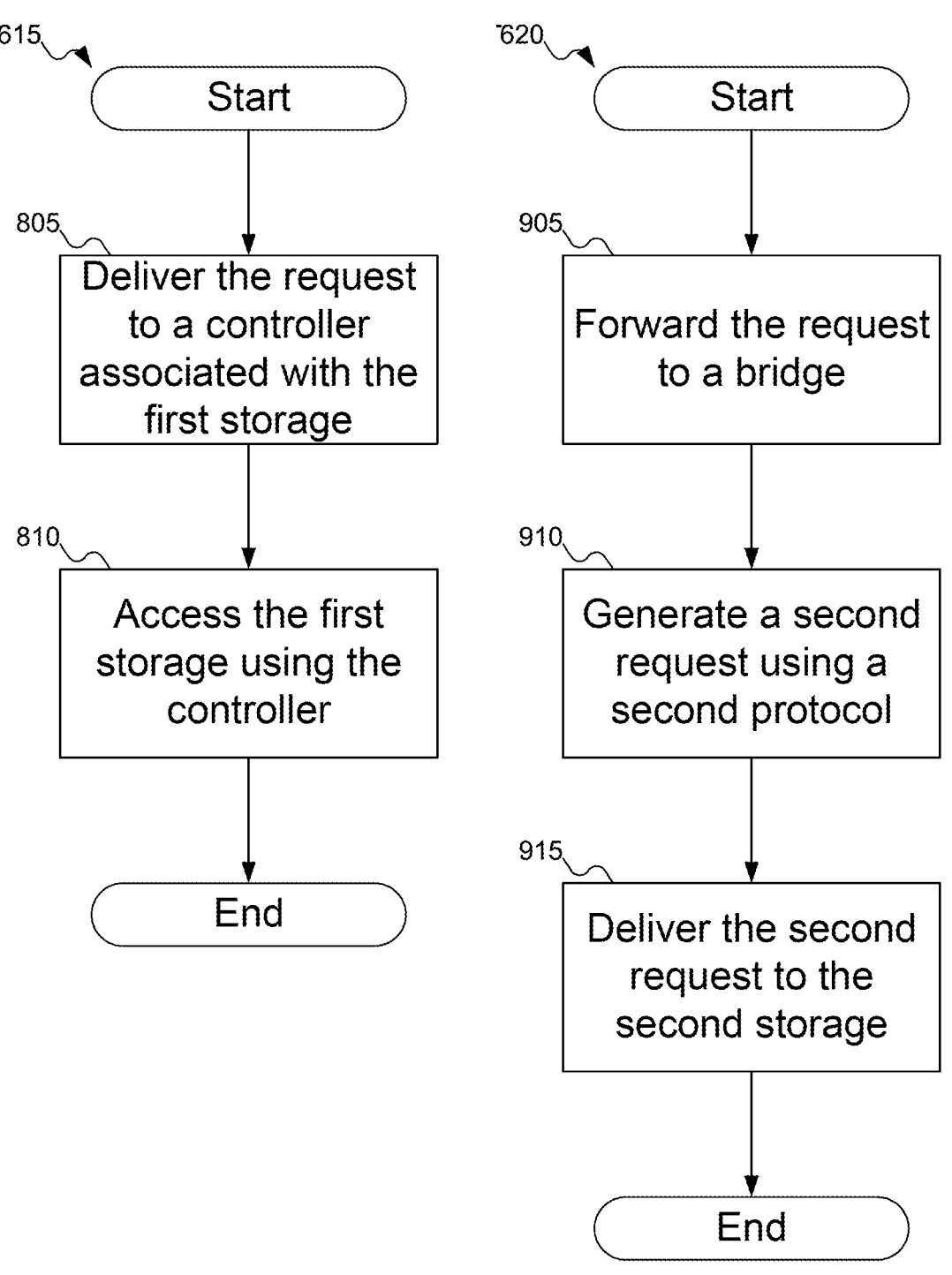
FIG. 8          FIG. 9

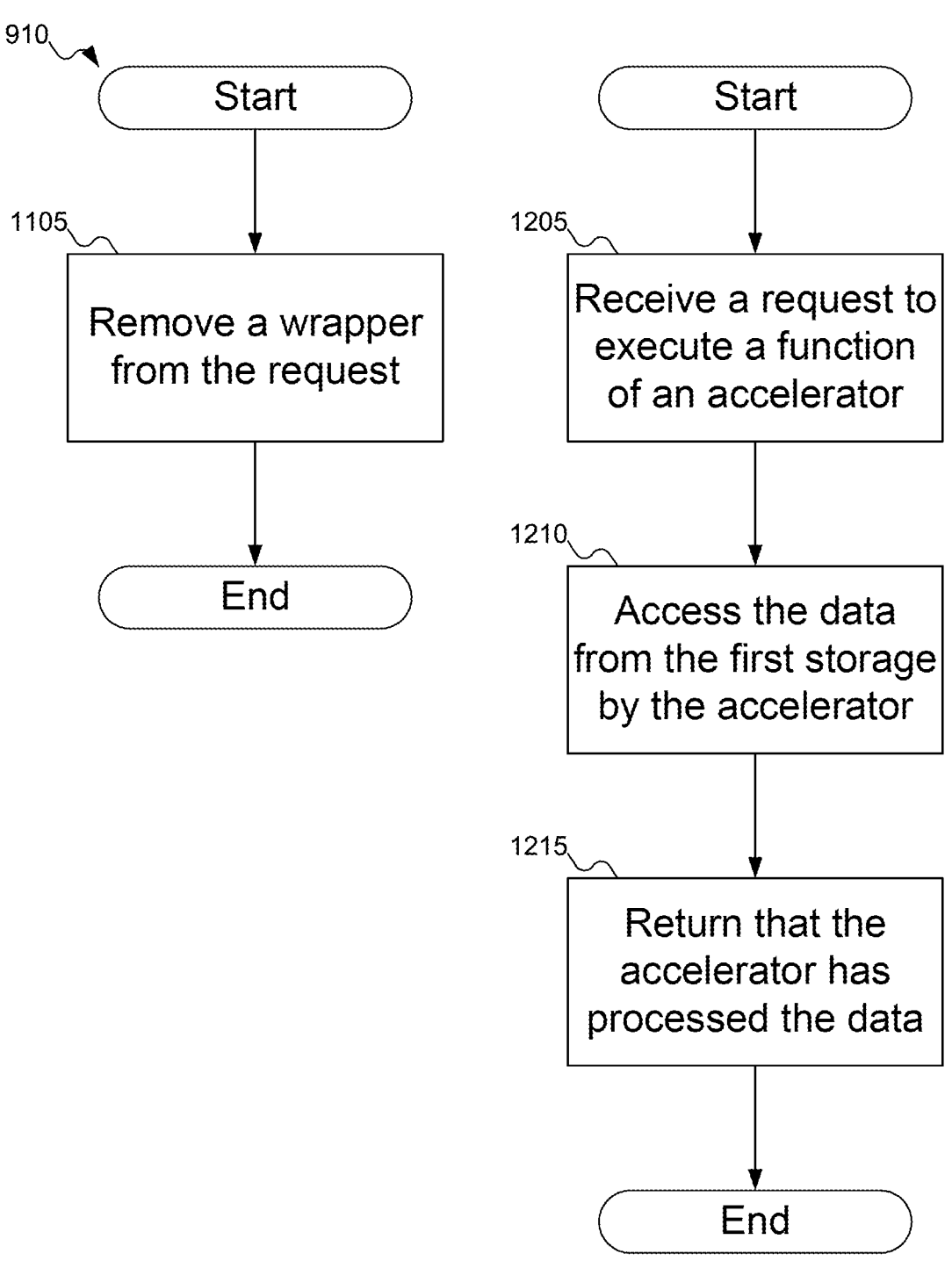
FIG. 11            FIG. 12

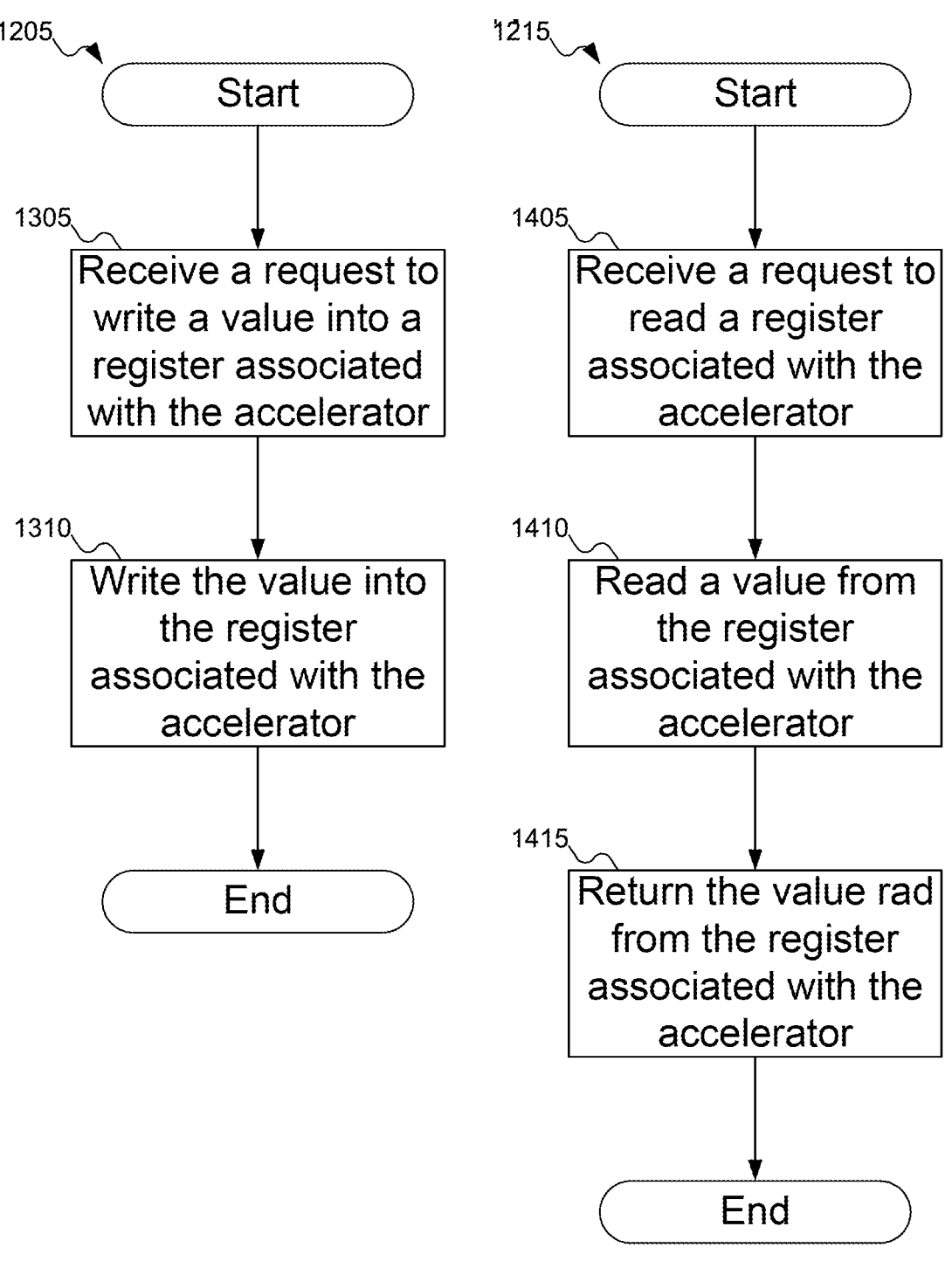
FIG. 13                    FIG. 14

SYSTEMS AND METHODS FOR A CACHE-COHERENT INTERCONNECT PROTOCOL STORAGE DEVICE

RELATED APPLICATION DATA

This application claims the benefit of U.S. Provisional Patent Application Ser. No. 63/452,159, filed Mar. 14, 2023, which is incorporated by reference herein for all purposes.

FIELD

The disclosure relates generally to memory and storage, and more particularly to providing a cache-coherent interconnect protocol interface to a storage device.

BACKGROUND

Many applications, such as artificial intelligence models, rely on databases that are large. Each individual access might not take a relatively long time. But when multiplied by the number of individual accesses that might be made to process some data, the latency for each individual access may become significant.

Storing the entire database in fast storage (such as Dynamic Random Access Memory (DRAM)) may ensure rapid access to the data. But the relative cost of DRAM to other forms of storage may make the cost of using DRAM to store the data prohibitive.

A need remains to support faster data access.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 8 shows a flowchart of an example procedure for the memory device of FIG. 1 to access data from the buffer of FIG. 3, according to embodiments of the disclosure.

FIG. 9 shows a flowchart of an example procedure for the memory device of FIG. 1 to access data from the storage device of FIG. 3, according to embodiments of the disclosure.

FIG. 11 shows a flowchart of an example procedure for the bridge of FIG. 3 to generate a request to be sent to the storage device of FIG. 3, according to embodiments of the disclosure.

FIG. 12 shows a flowchart of an example procedure to execute a function of the accelerator of FIG. 3, according to embodiments of the disclosure.

FIG. 13 shows a flowchart of an example procedure for the processor of FIG. 1 to invoke the accelerator of FIG. 3, according to embodiments of the disclosure.

FIG. 14 shows a flowchart of an example procedure for the processor of FIG. 1 to determine the status of the accelerator of FIG. 3, according to embodiments of the disclosure.

SUMMARY

Figure 1:
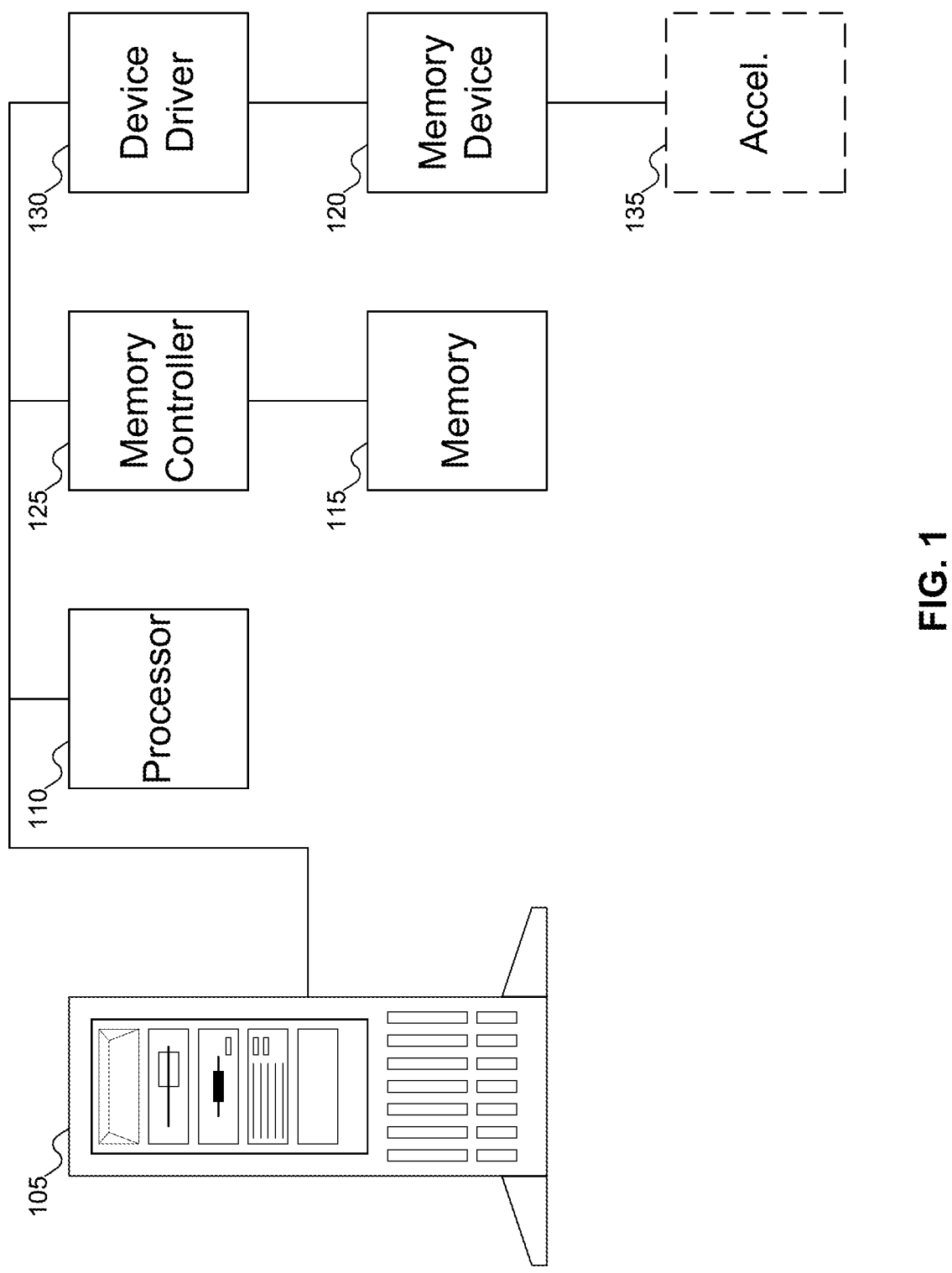
FIG. 1 shows a machine including a memory device to store data, according to embodiments of the disclosure.

A memory device may include a first storage and a second storage. Data may be accessed from either the first device or the second device. A bridge may connect to a storage device, which may support a different protocol from the memory device. A filter may manage a data transfer between the first storage and the second storage.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Many applications, such as artificial intelligence models or machine learning models, may process relatively large amounts of data. Executing a particular command may involve accessing large amounts of data. While the latency associated with an individual data access might not be a significant factor when only one data element is accessed from the database, even a small difference latency may become a significant factor when thousands or millions (or more) of data elements are used by the application to execute a particular command. For example, the average latency of Dynamic Random Access Memory (DRAM) is between 10-20 nanoseconds (ns), whereas the average latency of a Solid State Drive is 40-60 microseconds (μs). DRAM is therefore 2000 times faster than an SSD (or more).

Installations could therefore achieve fast data access by installing large amounts of DRAM to store all the data (and use a non-volatile storage, such as an SSD, as a backup again data loss due to power interruptions or other factors). But DRAM is also more expensive than an SSD: the average price for 1 gigabyte (GB) of SSD is approximately $0.06, whereas the average price for 1 GB of DRAM is approximately $0.43, making DRAM approximately seven times more expensive than an SSD. And since DRAM is volatile storage, non-volatile storage may also be needed to protect against data loss, further increasing the price per GB of data to be stored.

Embodiments of the disclosure include a device including a back-end storage device and a memory. The back-end storage device may support a block protocol, such as the Non-Volatile Memory Express protocol, whereas the device as a whole may support a cache-coherent interconnect protocol. A lightweight bridge may connect the host and the back-end storage device, so that the block protocol may be used to access data from the back-end storage device. The memory may support access using the cache-coherent interconnect protocol.

The lightweight bridge may also include a filter. The filter may identify host memory addresses that are stored in the memory of the device. When a request is issued to transfer data between the back-end storage device and the memory, if the address where the data is to be transferred is in the memory of the device, the filter may direct the data to the memory instead of the host.

The device may also include an accelerator. The accelerator may operate on data in the memory of the device. Functions of the accelerator may be invoked by using cache-coherent interconnect protocol commands, rather than by triggering exposed functions of the accelerator.

FIG. 1 shows a machine including a memory device to store data, according to embodiments of the disclosure. In FIG. 1, machine 105, which may also be termed a host or a system, may include processor 110, memory 115, and memory device 120. Processor 110 may be any variety of processor. Processor 110 may also be called a host processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), flash memory, etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115.

Memory device 120 may be used to extend memory 115. That is, memory 115 may consist of one form of memory, whereas memory device 120 may include another form of memory. Processor 110 may see memory 115 and memory device 120 as one large region of memory. For example, memory device 120 may use a cache-coherent interconnect protocol, such as Compute Express Link™ (CXL™) protocols. (Compute Express Link and CXL are trademarks of the CXL Consortium in the United States.) CXL protocols may include various protocols that may be used to access data from memory device 120 as though memory device 120 was part of memory 115. Memory device 120 may use a persistent storage, such as a storage device, to store data that may be termed "long-term": that is, data that is expected to be stored for longer periods of time, or that does not need to be stored in memory 115. Memory device 120 may be accessed using device driver 130. While FIG. 1 shows one memory device 120, there may be any number (one or more) of memory devices in machine 105. Memory device 120 is discussed further with reference to FIG. 3 below.

Machine 105 may also include one or more storage devices (not shown in FIG. 1). A storage device 120 may also be used to store data that may be termed "long-term": that is, data that is expected to be stored for longer periods of time, or that does not need to be stored in memory 115. Storage device 120 may also be accessed using device driver 130 (or using another device driver).

Embodiments of the disclosure may include any desired mechanism to communicate with memory device 120. For example, memory device 120 may connect to one or more busses, such as a Peripheral Component Interconnect Express (PCIe) bus, or memory device 120 may include Ethernet interfaces or some other network interface. Potential interfaces and/or protocols to memory device 120 may also or additionally include Non-Volatile Memory Express (NVMe), NVMe over Fabrics (NVMe-oF), Remote Direct Memory Access (RDMA), Transmission Control Protocol/Internet Protocol (TCP/IP), Universal Flash Storage (UFS), embedded MultiMediaCard (eMMC), InfiniBand, Serial Attached Small Computer System Interface (SCSI) (SAS), Internet SCSI (iSCSI), Serial AT Attachment (SATA), and cache-coherent interconnect protocols, such as the CXL protocols, among other possibilities, some of which might be used over busses or connections such as PCIe, Ethernet, etc.

While the above discussion uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure.

Figure 2:
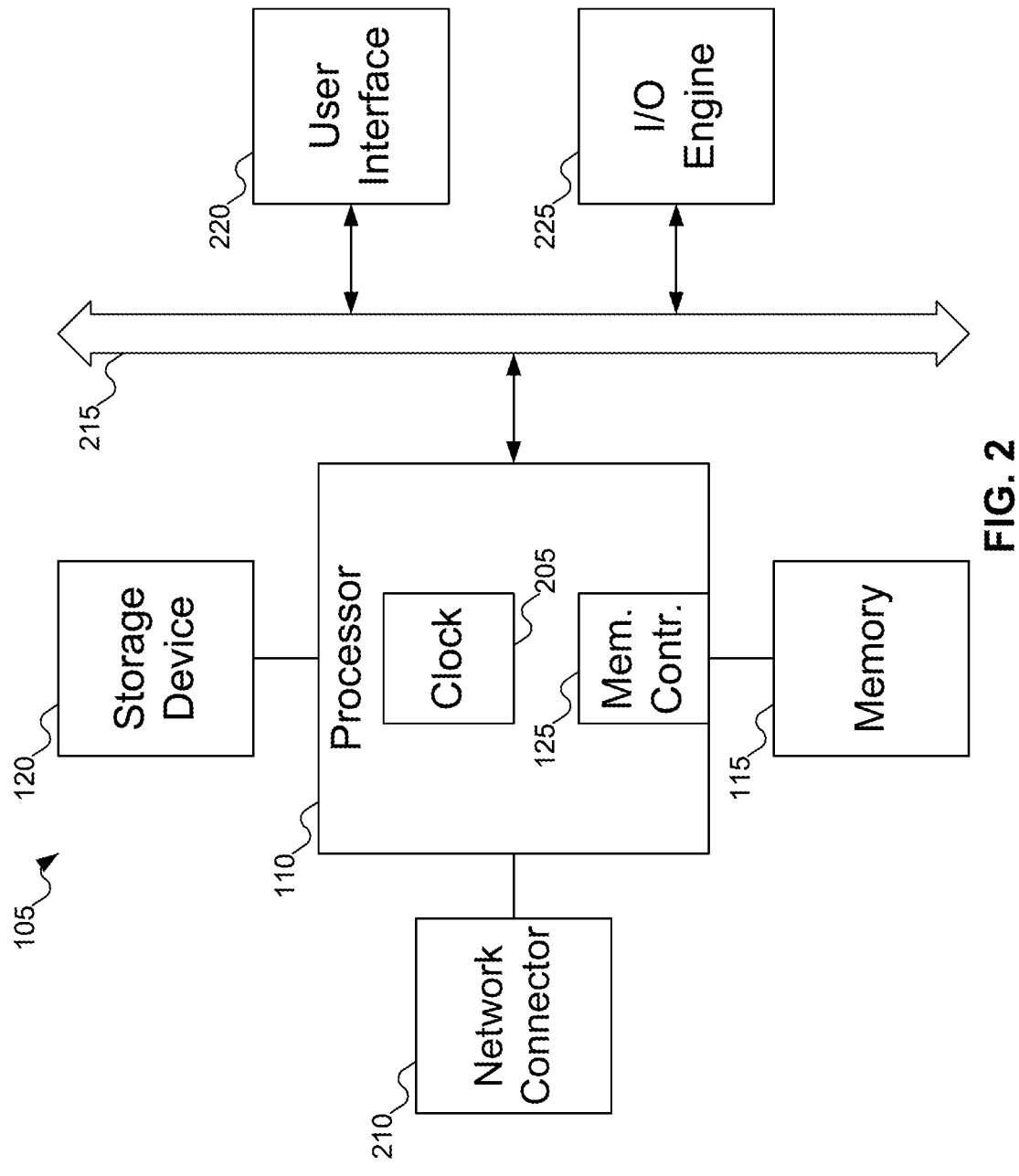
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to memory devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
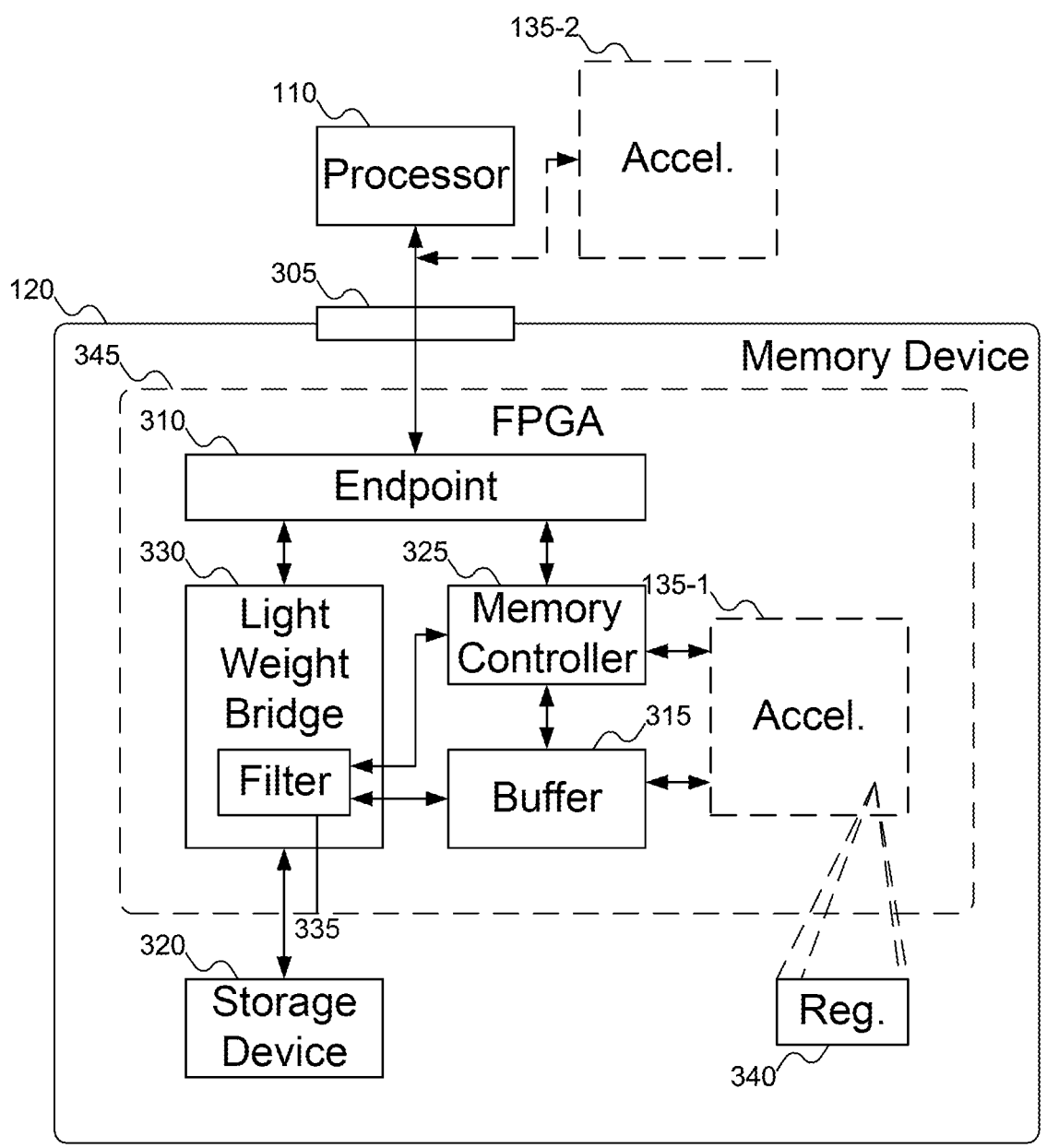
FIG. 3 shows details of the memory device of FIG. 1, according to embodiments of the disclosure.

FIG. 3 shows details of memory device 120 of FIG. 1, according to embodiments of the disclosure. In FIG. 3, memory device 120 may include interface 305, which may provide a connection with other equipment in machine 105 of FIG. 1, such as processor 110. Interface 305 may be a port or pins where a communication line, such as a cable, may be connected, or interface 305 may be an edge connector, such as might fit into a PCIe expansion slot. Interface 305 may also take other forms, such as a wireless interface: all such interfaces are considered part of embodiments of the disclosure. Interface 305 may provide a connection to a bus, such as a PCIe bus, an Ethernet bus, or any other variety of bus, over which communication may travel between memory device 120 and processor 110. This traffic may include communications using, for example, a cache-coherent interconnect protocol such as CXL, enabling processor 110 to access data from memory device 120.

Memory device 120 may also include endpoint 310. Endpoint 310 may expose to processor 110 the functionalities of memory device 120. Endpoint 310 may inform machine 105 of FIG. 1 of the available capacity offered by memory device 120. This available storage may then be viewed by processor 110 as though it was an extension of memory 115 of FIG. 1

Memory device 120 may also include buffer 315 and storage device 320. Buffer 315 and storage device 320 may act as tiers in a tiered storage system. While FIG. 3 shows two tiers identified as buffer 315 and storage device 320, embodiments of the disclosure may include more than two tiers. Further, embodiments of the disclosure may use any desired forms of storage for tiers. For example, one tier might include DRAM, SRAM, MRAM, or on-chip storage, and another tier might include a hard disk drive or an SSD. One tier, such as the tier represented in FIG. 3 by buffer 315 may be referred to as a first storage, and the other tier, such as the tier represented in FIG. 3 by storage device 320, may be referred to as a second storage. Alternatively, buffer 315 may be thought of as a cache for data normally stored in storage device 320.

In general, the first storage be a faster form of storage than the second storage, but also may be more expensive per unit than the second storage. For example, DRAM is typically faster to access than an SSD or a hard disk drive. But DRAM is also typically more expensive than an SSD or a hard disk drive on a per unit basis. Thus, instead of equipping memory device 120 just with large amounts of DRAM (at a high cost) or just with a large SSD or hard disk drive (with slower data access), a balance may be drawn between cost and speed. Buffer 315 may act as a cache for data stored on storage device 320. (In some embodiments of the disclosure, buffer 315 may store data written by processor 110 but not yet stored on storage device 320: with the expectation that the data will ultimately be written to storage device 320. In other embodiments of the disclosure, data written by processor 110 may be written to storage device 320 first, and then copied into buffer 315.) While DRAM and SSD/hard disk drive are used here as example, buffer 315 and/or storage device 320 each may be any form of storage: embodiments of the disclosure may include any desired forms for buffer 315 and/or storage device 320. In addition, buffer 315 and/or storage device 320 may have any desired capacities: in some embodiments of the disclosure, buffer 315 might have a larger capacity than storage device 320.

But by including both buffer 315 and storage device 320, memory device 120 may need to manage which tier of storage stores a particular data. In general, because storage device 320 is large and relatively slower, storage device 320 may be a persistent storage device. By storage device 320 being persistent, memory device 120 may also guard against data loss due to unexpected events (such as a power interruption). Thus, memory device 120 may copy data from storage device 320 to buffer 315 when needed, and may delete data from buffer 315 when room is needed for other data to be stored in buffer 315. Memory device 120 may also copy data back from buffer 315 to storage device 320 in response to the data in buffer 315 being updated, to ensure the updated data is also stored on storage device 320. Note that when processor 110 issues a Store request to memory device 120, memory device 120 may use buffer 315 as either a write-through cache or a write-back cache. That is, in some embodiments of the disclosure, memory device 120 may update data in both buffer 315 and storage device 320 (a write-through cache), or memory device 120 may update data only in buffer 315, and may update data in storage device 320 in response to the data being evicted from buffer 315 (a write-back cache). Embodiments of the disclosure may implement buffer 315 as either a write-through cache or a write-back cache, as well as any other variations thereof. Memory device 120 may use a cache controller (not shown in FIG. 3) to handle the movement of data between buffer 315 and storage device 320 to handle requests using buffer 315.

As noted above, endpoint 310 may expose a capacity for memory device 120. This exposed capacity may be smaller than, equal to, or larger than the size of buffer 315. To support endpoint 310 exposing a capacity larger than buffer 315, buffer 315 may act as a cache for data otherwise stored in storage device 320.

Memory device 120 may access data from buffer 315 via a controller, such as memory controller 325 (which may also be referred to simply as a controller, or by a term identifying the type of storage used for buffer 315, such as a DRAM controller if buffer 315 is implemented using DRAM). For example, memory controller 315 might be a memory controller similar to memory controller 125 of FIG. 1. If buffer 315 is implemented using a different form of storage for the first storage, then memory controller 325 may be similarly replaced to manage access to the form of storage used for buffer 315.

Memory device 120 may be designed to support a cache-coherent interconnect protocol. A cache-coherent interconnect protocol, such as the CXL protocol, may actually include more than one way to access data. For example, a cache-coherent interconnect protocol may support both a byte-level access protocol (that is, a protocol that accesses data at a byte granularity) and a block-level access protocol (that is, a protocol that accesses data in units of blocks that may include, for example, 2 kilobytes (KB), 4 KB, 8 KB, or other sizes). In some embodiments of the disclosure, a byte-level access protocol may include commands to access data from memory device 120 as though memory device 120 was part of memory 115 of FIG. 1, whereas a block-level access protocol may include commands to access data from memory device 120 as though memory device 120 was a storage device, such as storage device 320.

The reason why processor 110 might want to use both byte-level access protocols and block-level access protocols may be explained by amount of data to be accessed. If only a small amount of data (relatively smaller than a block) is to be accessed, byte-level access protocols may be more efficient. But for large amounts of data (relatively equal to or larger than a block), moving data from storage device 320 into buffer 315 and then to processor 110 may be relatively inefficient: large amount of data might need to be evicted from buffer 315 to make room for data being loaded from storage device 320. In other words, data that might be better kept in buffer 315 might be evicted, only to be loaded back into buffer 315 relatively soon thereafter. This problem might be magnified if the data being loaded from storage device 320 into buffer 315 to handle the request from processor 110 is not needed again thereafter: a significant amount of data might have been evicted only to have to be reloaded shortly thereafter. But if the data is requested using a block-level access protocol, then the data might bypass buffer 315, which may avoid evicting data from buffer 315 unnecessarily.

In some embodiments of the disclosure, storage device 320 may use different protocols from memory device 120. For example, while memory device 120 may support cache-coherent interconnect protocol as described above, storage device 320 may support a different protocol: for example, an NVMe protocol. Embodiments of the disclosure may support storage device 320 using any desired protocol: for example, NVMe, SATA, or SCSI, among other possibilities. While storage device 320 might not support a cache-coherent interconnect protocol, memory device 120 may still utilize storage device 320. In such embodiments of the disclosure, light weight bridge 330 may translate between the protocols used by memory device 120 and storage device 320, generating requests in the protocol supported by storage device 320 from requests submitted using the protocol supported by memory device 120.

Light weight bridge 310 (which may also be referred to as a PCIe-to-PCIe bridge or just a bridge) may deliver requests from endpoint 310 to storage device 320. In this manner, memory device 120 may support handling byte-level access protocol requests using buffer 315 (and controller 325) and block-level access protocol requests using storage device 320. Requests that use byte-level access protocols (for example, CXL.mem or CXL.cache protocol requests) may be delivered by endpoint 310 (or by light weight bridge 330) to controller 325 for ultimate handling using buffer 315. On the other hand, requests that use block-level access protocols (for example, NVMe access requests) may be delivered to light weight bridge 330 for ultimate delivery to storage device 320.

In some embodiments of the disclosure, processor 110 may issue all requests using a cache-coherent interconnect protocol. For example, processor 110 might issue requests using CXL.io protocol requests to perform block-level access of storage device 320. But if storage device 320 does not support that protocol, then storage device 320 might not be able to natively handle the request as issued by processor 110. Thus, light weight bridge 330 may generate another request using the protocol supported by storage device 320 from the request issued by processor 110.

In some embodiments of the disclosure, the protocol supported by memory device 120 for block-level access protocol requests might simply be a wrapper around a block-level access request in the protocol supported by storage device 320. In such embodiments of the disclosure, light weight bridge 330 may generate the request using the protocol supported by storage device 320 by stripping the wrapper off the request issued by processor 110. For example, processor 110 might send an NVMe access request, wrapped as a CXL.io request, wrapped as a PCIe transaction, and light weight bridge 330 might strip off the PCIe and CXL.io wrappers, leaving just an NVMe access request (or an NVMe access request wrapped as a PCIe transaction) to be delivered to storage device 320.

There may be situations where processor 110 wants to read data from storage device 320 and store that data in some address of the system memory. For example, processor 110 might issue a block-level access protocol Direct Memory Address (DMA) transfer. Since memory device 120 may be used to extend memory 115 of FIG. 1, this fact means that the address into which the data is to be loaded might be in memory 115 of FIG. 1, or the address into which the data is to be loaded might be in buffer 315. While it is possible to read the data from storage device 320 and deliver the data to processor 110, after which the data is sent back to buffer 315, this might be inefficient. After all, if memory device 120 includes both storage device 320 and buffer 315, then a transfer between storage device 320 and buffer 315 may be accomplished without the data having to be delivered to processor 110 at all. Filter 335 may be used in such situations.

When light weight bridge 330 determines that processor 110 has issued a request to read data from storage device 320 into an address in the extended memory of system 105 of FIG. 1, filter 335 may determine if the address in question is assigned to memory device 120 or to memory 115 of FIG. 1. If the address in question is in memory device 120, then filter 335 may redirect the data transfer to deliver the data directly to buffer 315. Otherwise, filter 335 may permit the data transfer to proceed as normal, with the data delivered back to processor 110 for ultimate storage in memory 115 of FIG. 1. In this sense, filter 335 may coordinate or otherwise manage data transfers between storage device 320 and either buffer 315 or memory 115 of FIG. 1: filter 335 may determine whether a particular data transfer should be directed to buffer 315 or memory 115 of FIG. 1.

To be able to determine which address range(s) of the extended memory has been assigned to memory device 120, controller 325 may provide the address range(s) of the extended memory assigned to memory device 120 to filter 335. Controller 325 may know the address range assigned to memory device 120 by receiving that information from system 105 of FIG. 1 (when the entire available extended memory has been determined, address ranges may be assigned to memory 115 of FIG. 1 and memory device 120, and each may know the address ranges applicable to both memory 115 of FIG. 1 and memory device 120). Thus, controller 325 may be able to store in filter 335 the address range(s) assigned to memory device 120, enabling filter 335 to determine when to direct a data transfer to buffer 315.

While the above discussion focuses on requests to read data from storage device 320 and transfer that data into the extended memory of system 105 of FIG. 1 (be it in memory 115 of FIG. 1 or memory device 120), embodiments of the disclosure may also include requests to write data to storage device 320 from the extended memory of system 105. That is, processor 110 may issue a request to transfer data from an address in the extended memory of system 105 of FIG. 1 and write that data into storage device 320. Rather than loading such data from buffer 315 into processor 110 and then send the data to storage device 320, the data may be transferred directly from buffer 315 into storage device 320 via light weight bridge 330, which may be a more efficient arrangement. In addition, embodiments of the disclosure may also handle requests for data transfers that originate from storage device 320, rather than from processor 110. That is, as a result of processing a request from processor 110, storage device 320 may itself issue a request to initiate a data transfer. Filter 335 may direct such data transfers to buffer 315 or to memory 115 of FIG. 1 as appropriate, even with the request issuing from storage device 320. For example, such data transfers might be the result of a pread or pwrite command, which may transfer data from a file handle without updating data pointers.

In some embodiments of the disclosure, where memory device 120 may use buffer 315 as a cache for data in storage device 320, memory device 120 may also include a cache controller (not shown in FIG. 3). This cache controller may function similar to the cache controller described in U.S. patent application Ser. No. 18/515,218, filed Nov. 20, 2023, which claims the benefit of U.S. Provisional Patent Application Ser. No. 63/452,691, filed Mar. 16, 2023, both of which are incorporated by reference herein for all purposes. That is, the cache controller may determine what data to load from storage device 320 into buffer 315 and when (including prefetching data from storage device 320 into buffer 315 when appropriate), what data to evict from buffer 315 and when (including writing data back to storage device 320 when appropriate), and may store metadata relevant to such data accesses and evictions. Such a cache controller may also include a prefetch circuit to select data to prefetch from storage device 320 into buffer 315 (that is, to copy data from storage device 320 into buffer 315 in the expectation that processor 110 will access such data in an upcoming request), although such a prefetch circuit might be a circuit designed to support all applications as well as possible, rather than being tailored for use with a particular application.

In some embodiments of the disclosure, memory device 120 may also include an accelerator, such as accelerator 135-1. In other embodiments of the disclosure, an accelerator, such as accelerator 135-2, may be outside memory device 120. (Accelerators 135-1 and 135-2 may be referred to collectively as accelerators 135.) Regardless of whether accelerator 135 is part of memory device 120 or outside of memory device 120, processor 110 may invoke functions offered by accelerator 135 using the protocol supported by memory device. For example, accelerator 135 may have an associated register, such as register 340. Processor 110 may write a value into register 340, just as though it was any other memory address (for example, using a byte-level access protocol supported by memory device 120). Accelerator 135 may detect that an appropriate value has been written into register 340, which may trigger accelerator 135 to execute a function. For example, accelerator 135 may check the value of register 340 periodically (for example, in a no-operation loop or a loop that operates at intervals, such as every five us or every five clock cycles: other intervals may also be used) until register 340 is determined to store a value that indicates a function is to be executed.

The value written into register 340 may include various information. For example, the value written into register 340 may include an identifier (for example, an opcode) of a particular function offered by accelerator 135 that is to be executed. Thus, if the value written into register 340 is a zero, one function might be executed, whereas if the value written into register 340 is a one, a different function might be executed.

Upon completion of its execution of a function, accelerator 135 may overwrite the value in register 340. For example, processor 110 may write a value of one into register 340 to indicate that a function is to be executed. Upon completing execution of the function, accelerator 135 may overwrite the value in register 340 with, for example, zero. In this manner, accelerator 135 may be able to determine when a function is to be executed. Note that this operation may be useful even if accelerator 135 only offers one function.

The value written into register 340 may also include an address (or an address range, which might be defined by a base address and a size, or a base address, an offset, and a size) where data is stored in buffer 315 which the function offered by accelerator 135 is to use. The value written into register 340 may also include an address into buffer 315 where a result of the function is to be written by accelerator 135.

While FIG. 3 shows accelerator 135 as including only one register 340, some embodiments of the disclosure may include additional registers. For example, one register might be used to store a value indicating the function offered by accelerator 135 to be executed, another register might be used to store the address where the data to be processed may be found in buffer 315, another register might be used to store the address in buffer 315 where the result is to be stored, and so on.

Accelerator 340 may also have a status register (not shown in FIG. 3). Processor 110 may read a value from this register to determine the status of accelerator 135. For example, accelerator 135 may write one value into this register when it begins operations, and another value into this register when the function is complete. In this manner, processor 110 may be able to determine when processing is complete and the result is available to be read from buffer 315. Note that this status register may be combined with register 340: for example, if accelerator 135 leaves the value identifying the function to be executed in register 340 until execution of the function has finished, at which point register 340 may be overwritten by accelerator 135 with a new value, then processor 110 may read the value from register 340 until the value in register 340 has changed, indicating that accelerator 135 has completed execution of the requested function.

While FIG. 3 shows register 340 as being in accelerator 135 (for example, in some storage offered by accelerator 135), embodiments of the disclosure may place register 340 elsewhere. For example, register 340 might be a particular address in buffer 315, or it might be a particular address in storage device 320. In embodiments where multiple registers may be used to pass information between processor 110 and accelerator 135, each register may be in the any location (in a storage offered by accelerator 135, in buffer 315, or in storage device 320), and different registers might be in different locations.

Memory device 120 may include circuitry to implement endpoint 310, buffer 315, controller 325, light weight bridge 330 (and filter 335), and accelerator 135 (if implemented as part of memory device 120). Such circuitry may include a Field Programmable Gate Array (FPGA), an Application-Specific Integrated Circuit (ASIC), a System-on-a-Chip (SoC), a single core processor or a multi-core processor, a Central Processing Unit (CPU), a Graphics Processing Unit (GPU), a General Purpose GPU (GPGPU), a Tensor Processing Unit (TPU), or a Neural Processing Unit (NPU), among other possibilities, represented in FIG. 3 as FPGA 345.

Figure 4:
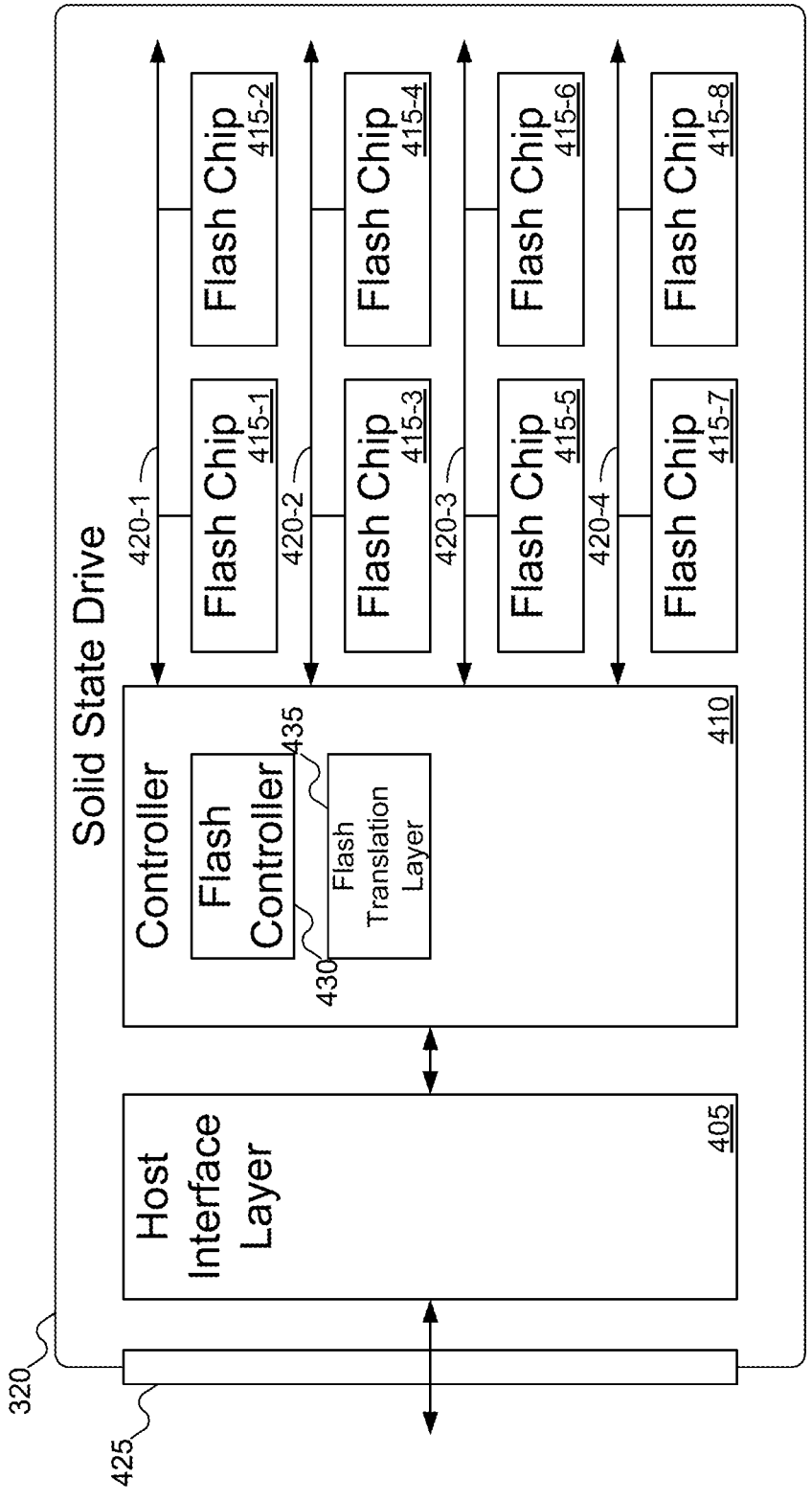
FIG. 4 shows details of the storage device of FIG. 3, according to embodiments of the disclosure.

FIG. 4 shows details of storage device 320 of FIG. 3, according to embodiments of the disclosure. In FIG. 4, the implementation of storage device 320 is shown as for a Solid State Drive (SSD), but embodiments of the disclosure may include other implementations, such as a hard disk drive. In FIG. 4, storage device 320 may include host interface layer (HIL) 405, controller 410, and various flash memory chips 415-1 through 415-8 (also termed "flash memory storage"), which may be organized into various channels 420-1 through 420-4. Host interface layer 405 may manage communications between storage device 320 and other components (such as processor 110 of FIG. 1). Host interface layer 405 may also manage communications with devices remote from storage device 320: that is, devices in communication with storage device 320, possibly over one or more network connections. These communications may include read requests to read data from storage device 320, write requests to write data to storage device 320, and delete requests to delete data from storage device 320. Note that storage device 320 may process requests to read or write data received from light weight bridge 330 of FIG. 3 without knowledge that such requests originate from light weight bridge 330 of FIG. 3 and not from processor 110 of FIG. 1.

Host interface layer 405 may manage an interface across only a single port, or it may manage interfaces across multiple ports. Alternatively, storage device 320 may include multiple ports, each of which may have a separate host interface layer 405 to manage interfaces across that port. Embodiments of the inventive concept may also mix the possibilities (for example, an SSD with three ports might have one host interface layer to manage one port and a second host interface layer to manage the other two ports). Host interface layer 405 may communicate with other components across connection 425, which may be, for example, a PCIe connection, an M.2 connection, a U.2 connection, a SCSI connection, or a SATA connection, among other possibilities.

SSD controller 410 may manage the read and write operations, along with garbage collection and other operations, on flash memory chips 415-1 through 415-8 using flash memory controller 430. Note that SSD controller 410 may be different from controller 325 of FIG. 3, as they offer different functionality: SSD controller 415 may manage reading data from and writing data to flash chips 415, whereas controller 325 of FIG. 3 may manage reading data from and writing data to buffer 315 of FIG. 3. SSD controller 410 may also include flash translation layer 435, which may manage the mapping of logical block addresses (LBAs) (as used by host 105 of FIG. 1) to physical block addresses (PBAs) where the data is actually stored on storage device 320. By using flash translation layer 435, host 105 of FIG. 1 does not need to be informed when data is moved from one block to another within storage device 320.

While FIG. 4 shows storage device 320 as including eight flash memory chips 415-1 through 415-8 organized into four channels 420-1 through 420-4, embodiments of the inventive concept may support any number of flash memory chips organized into any number of channels. Similarly, while FIG. 4 shows the structure of a SSD, other storage devices (for example, hard disk drives) may be implemented using a different structure from that shown in FIG. 4 to manage reading and writing data, but with similar potential benefits.

While FIG. 4 shows storage device 320 as being just a storage device, embodiments of the disclosure may include other components within storage device 320. For example, storage device 320 might have its own computational storage unit, which might be used by processor 110 of FIG. 1.

In some embodiments of the disclosure, the functionality of memory device 120 of FIG. 1 may be incorporated into storage device 320. For example, storage device 320 might include buffer 315 of FIG. 3, controller 325 of FIG. 3, and light weight bridge 330 of FIG. 3 (and filter 335 of FIG. 3).

Figure 5:
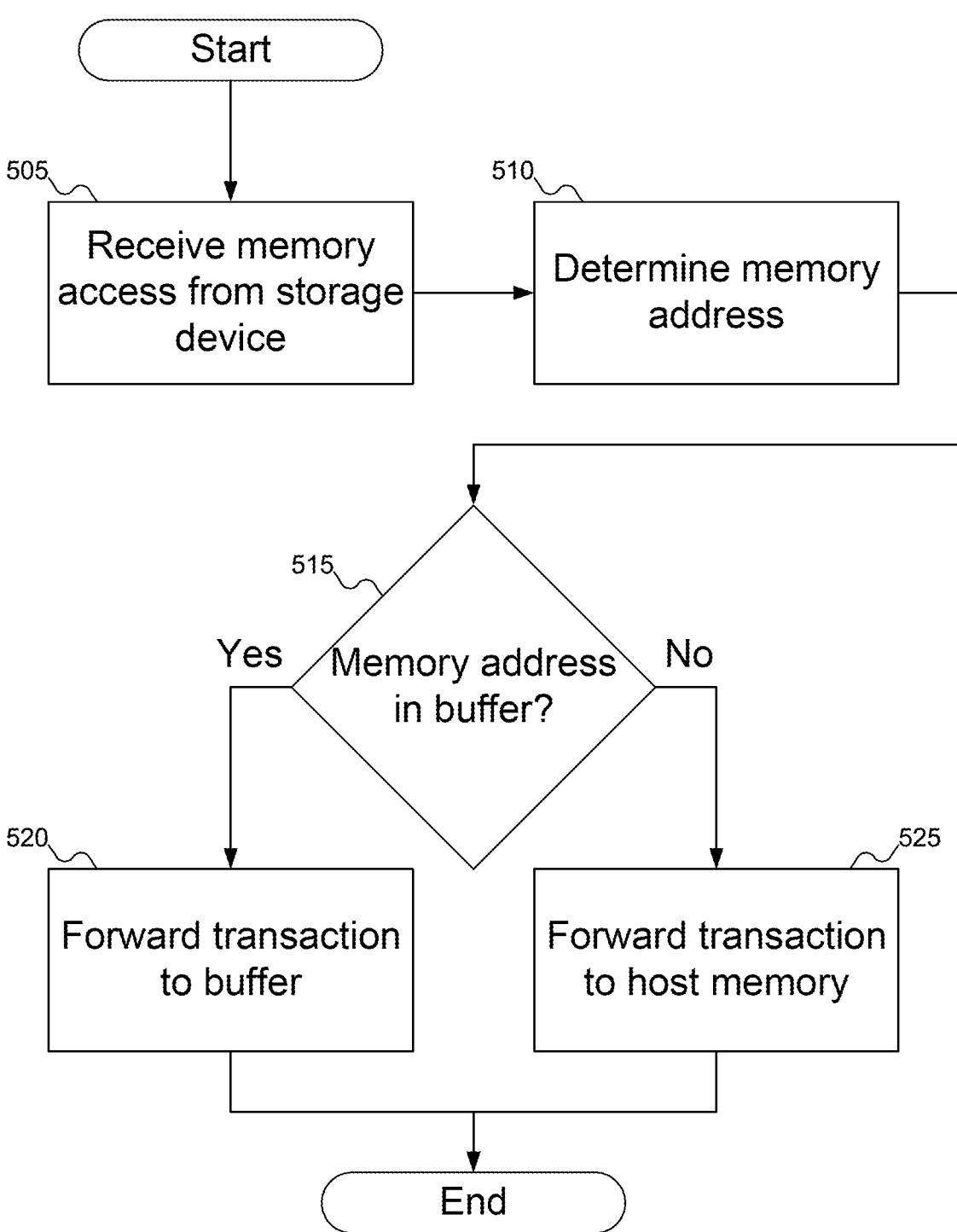
FIG. 5 shows a flowchart of an example procedure for the memory device of FIG. 1 to forward a transaction to either the memory of FIG. 1 or the buffer of FIG. 3, according to embodiments of the disclosure.

FIG. 5 shows a flowchart of an example procedure for memory device 120 of FIG. 1 to forward a transaction to either memory 115 of FIG. 1 or buffer 315 of FIG. 3, according to embodiments of the disclosure. In FIG. 5, at block 505, filter 335 of FIG. 3 may receive a memory access from storage device 320 of FIG. 3. At block 510, filter 335 of FIG. 3 may determine the memory address being accessed by storage device 320 of FIG. 3. At block 515, filter 335 of FIG. 3 may determine if the memory address is associated with memory device 120 of FIG. 1. If the memory address is associated with memory device 120 of FIG. 1, then at block 520, filter 335 of FIG. 3 may forward the transaction to buffer 315 of FIG. 3; otherwise, at block 525, filter 335 of FIG. 3 may forward the transaction to memory 115 of FIG. 1. Note that the data being accessed in the transaction might not currently be stored in buffer 315 of FIG. 3 (for example, if the transaction involves loading data into the memory address), in which case the memory address might not currently be stored in buffer 315 of FIG. 3 at the time the transaction is received by memory device 120 of FIG. 1.

Figure 6:
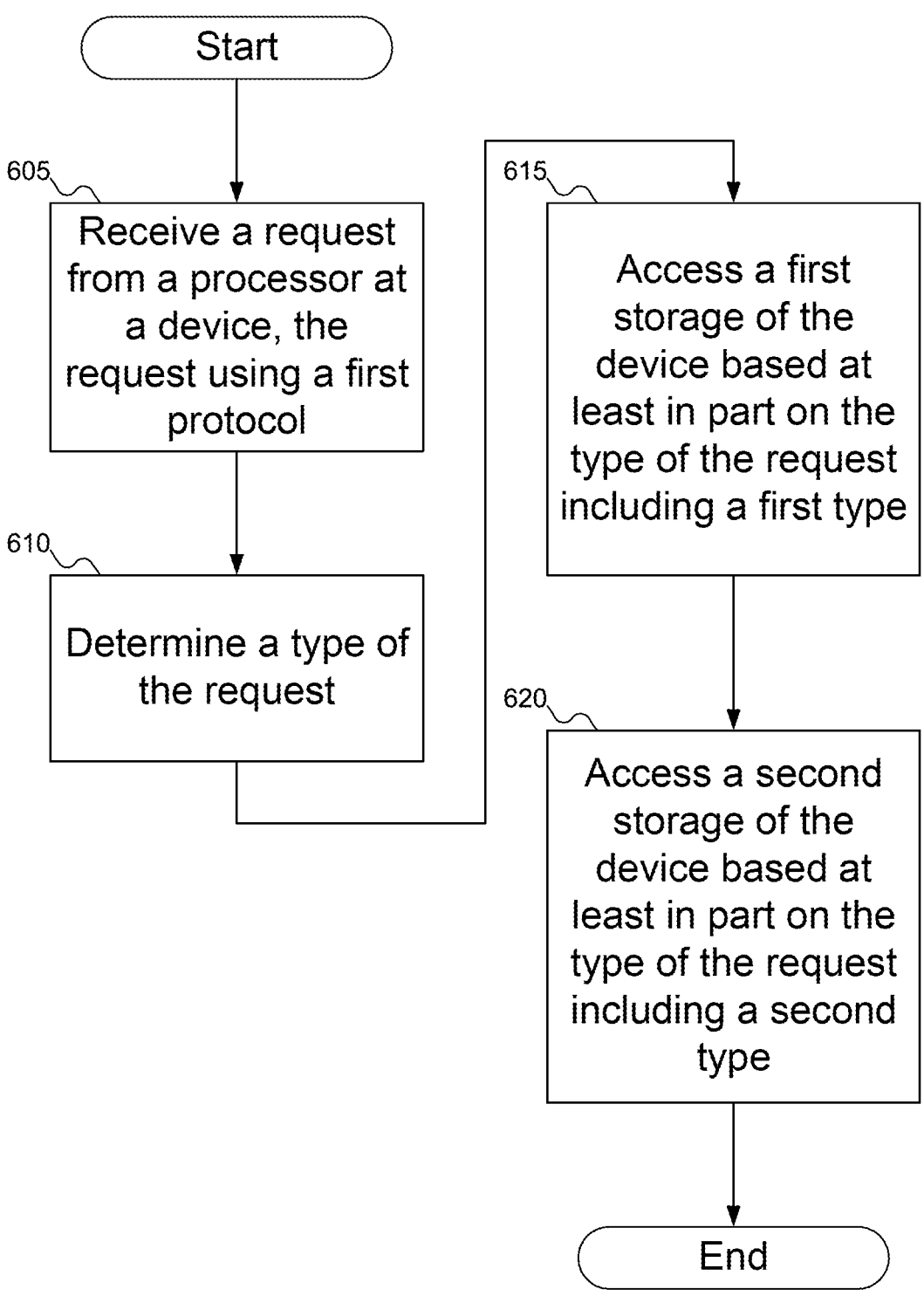
FIG. 6 shows a flowchart of an example procedure for the memory device of FIG. 1 to process a request issued by the processor of FIG. 1, according to embodiments of the disclosure.

Note that the flowchart of FIG. 5 relates to accessing data from storage device 320 of FIG. 3. Embodiments of the disclosure may also include copying or moving data between addresses associated with memory device 120 of FIG. 1, or between an address associated with memory device 120 of FIG. 1 and an address associated with memory 115 of FIG. 1. FIG. 6 shows a flowchart of an example procedure for memory device 120 of FIG. 1 to process a request issued by processor 110 of FIG. 1, according to embodiments of the disclosure. In FIG. 6, at block 605, memory device 120 of FIG. 1 may receive a request from processor 110 of FIG. 1. The request received at memory device 120 of FIG. 1 from processor 110 of FIG. 1 may using a protocol, such as a cache-coherent interconnect protocol. At block 610, memory device 120 of FIG. 1 may determine a type of the request: for example, whether the request is a byte-level access request (for example, a CXL.mem or CXL.cache protocol request) or a block-level access request (for example, a CXL.io protocol request). At block 615, memory device 120 of FIG. 1 may access a first storage, such as buffer 315 of FIG. 3, based on the request being of a first type, such as a byte-level access request. Finally, at block 620, memory device 120 of FIG. 1 may access a second storage, such as storage device 320 of FIG. 3, based on the request being of a second type, such as a block-level access request.

Figure 7:
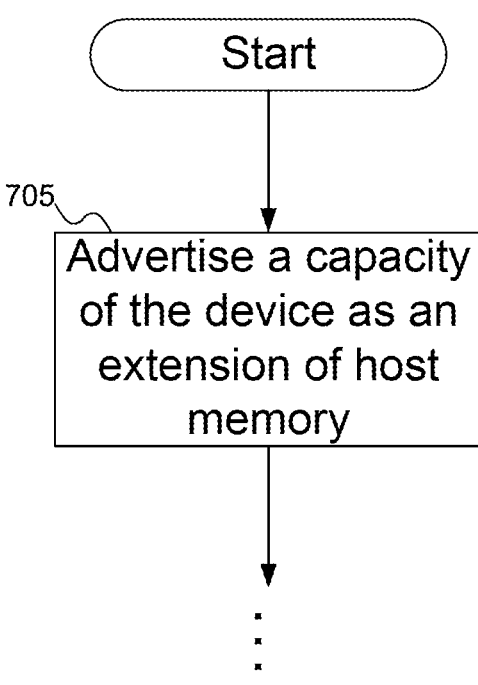
FIG. 7 shows a flowchart of an example procedure for the memory device of FIG. 1 to advertise a capacity that may be used to extend the memory of FIG. 1, according to embodiments of the disclosure.

FIG. 7 shows a flowchart of an example procedure for memory device 120 of FIG. 1 to advertise a capacity that may be used to extend memory 115 of FIG. 1, according to embodiments of the disclosure. In FIG. 7, at block 705, memory device 120 of FIG. 1 may advertise a capacity of memory device 120 of FIG. 1 that may be used as an extension of memory 115 of FIG. 1. Processing may then continue with block 605 of FIG. 6.

FIG. 8 shows a flowchart of an example procedure for memory device 120 of FIG. 1 to access data from buffer 315 of FIG. 3, according to embodiments of the disclosure. In FIG. 8, at block 805, memory device 120 of FIG. 1 may forward the request to controller 325 of FIG. 3 associated with buffer 315 of FIG. 3. At block 810, controller 325 of FIG. 3 may then access data from buffer 315 of FIG. 3.

FIG. 9 shows a flowchart of an example procedure for memory device 120 of FIG. 1 to access data from storage device 320 of FIG. 3, according to embodiments of the disclosure. In FIG. 9 at block 905, memory device 120 of FIG. 1 may forward a request to bridge 330 of FIG. 3. At block 910, bridge 330 of FIG. 3 may generate a second request from the first request. This second request may use another protocol, which may be different from the protocol used in the first request. For example, the first protocol might be a cache-coherent interconnect protocol, whereas the second protocol might be a storage device protocol, such as an NVMe protocol. Finally, at block 915, bridge 330 of FIG. 3 may deliver the second request to storage device 320 of FIG. 3.

Figure 10:
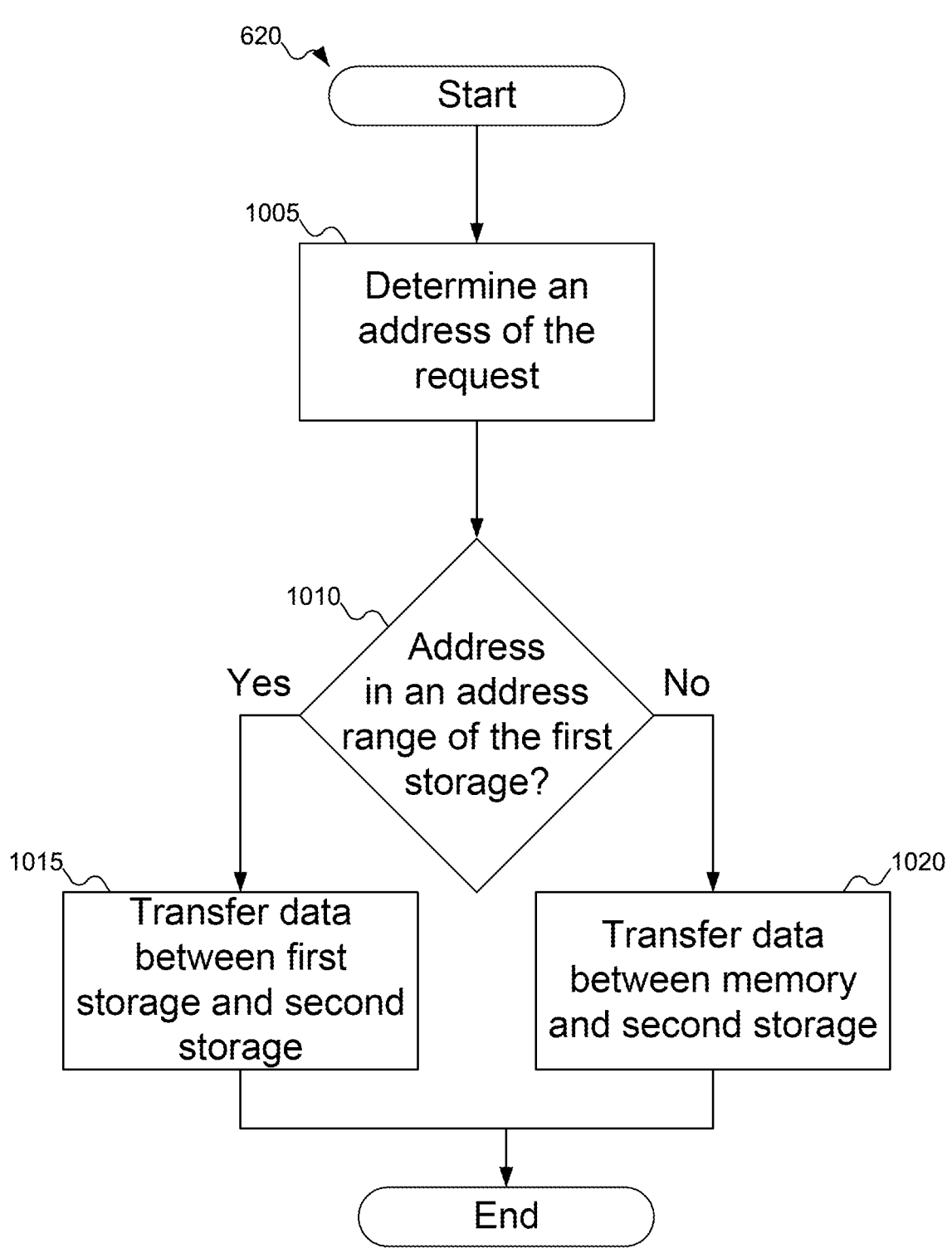
FIG. 10 shows a flowchart of an example procedure for the memory device of FIG. 1 to determine whether a transaction involves the memory of FIG. 1 or the buffer of FIG. 3, according to embodiments of the disclosure.

FIG. 10 shows a flowchart of an example procedure for memory device 120 of FIG. 1 to determine whether a transaction involves memory 115 of FIG. 1 or buffer 315 of FIG. 3, according to embodiments of the disclosure. In FIG. 10, at block 1005, filter 335 of FIG. 3 may determine an address used in the request. At block 1010, filter 335 of FIG. 3 may determine if the address is in an address range associated with a first storage, such as buffer 315 of FIG. 3. If so, then at block 1015, filter 335 of FIG. 3 may ensure that the data transfer is directed between a second storage, such as storage device 320 of FIG. 3 and the first storage, whereas if not, then at block 1020, filter 335 of FIG. 3 may permit the data transfer to be directed between the second storage and memory 115 of FIG. 1.

FIG. 11 shows a flowchart of an example procedure for the bridge of FIG. 3 to generate a request to be sent to storage device 320 of FIG. 3, according to embodiments of the disclosure. In FIG. 11, at block 1105, bridge 330 of FIG. 3 may remove a wrapper from the request to generate the second request. For example, if processor 110 of FIG. 1 issues an NVMe access request, wrapped using a CXL.io protocol, further wrapped as a PCIe packet, bridge 330 might remove both the CXL.io and PCIe wrappers and send just the NVMe access request to storage device 320 of FIG. 3, or bridge 330 might re-wrap the NVMe access request as a PCIe packet (but having removed the CXL.io protocol wrapper).

FIG. 12 shows a flowchart of an example procedure to execute a function of accelerator 135 of FIG. 3, according to embodiments of the disclosure. In FIG. 12, at block 1205, memory device 120 of FIG. 1 may receive a request from processor 110 of FIG. 1 to execute a function of accelerator 135 of FIG. 1. As noted above, this request may actually be to write a value into register 340 of FIG. 3, which accelerator 135 of FIG. 1 may then read to determine that a function is to be invoked. As discussed above, register 340 of FIG. 3 may be in a storage of accelerator 135 of FIG. 1, or register 340 of FIG. 3 may be in buffer 315 of FIG. 3 or storage device 320 of FIG. 3. At block 1210, accelerator 135 of FIG. 1 may access data from the first storage, such as buffer 315 of FIG. 3. Finally, at block 1215, accelerator 135 of FIG. 1 may return that accelerator 135 of FIG. 1 has completed processing of the data. This may include, for example, writing a result into an address or address range in the first storage, such as buffer 315 of FIG. 3, which processor 110 of FIG. 1 may then read to access the result produced by accelerator 135 of FIG. 1.

FIG. 13 shows a flowchart of an example procedure for processor 110 of FIG. 1 to invoke accelerator 135 of FIG. 3, according to embodiments of the disclosure. In FIG. 13, at block 1305, memory device 120 of FIG. 1 may receive a request from processor 110 of FIG. 1 to write a value into register 340 of FIG. 3 associated with accelerator 135 of FIG. 1. Then, at block 1310, memory device 120 of FIG. 1 may write the value into register 340 of FIG. 3 associated with accelerator 135 of FIG. 1.

FIG. 14 shows a flowchart of an example procedure for processor 110 of FIG. 1 to determine the status of accelerator 135 of FIG. 3, according to embodiments of the disclosure. In FIG. 14, at block 1405, memory device 120 of FIG. 1 may receive a request from processor 110 of FIG. 1 to read a register, such as register 340 of FIG. 3 (or another register) associated with accelerator 135 of FIG. 1. Then, at block 1410, memory device 120 of FIG. 1 may read the value from register 340 of FIG. 3 (or another register) associated with accelerator 135 of FIG. 1. Finally, at block 1415, memory device 120 of FIG. 1 may return the value read from register 340 of FIG. 3 (or another register) associated with accelerator 135 of FIG. 1 to processor 110 of FIG. 1.

In FIGS. 5-14, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Some embodiments of the disclosure may include a memory device including a first storage and a second storage. The memory device may support a first protocol, whereas the second storage may support a second protocol. The first storage may support access of one type, whereas the second storage may support access of a second type. The first storage may also act as a cache for data in the second storage. A bridge may generate a second request using the second protocol from the request using the first protocol. The memory device may therefore offer a technical advantage in that the second storage may be used to store data that may be cached for access from the first storage despite not supporting the protocol used to access data from the first storage. In this manner, any storage device, regardless of the supported protocol, may be used to store data that may be cached in the first storage.

Some embodiments of the disclosure may also include an accelerator. The accelerator may have an associated register that may be written to in the same manner as the first storage. The accelerator may detect when data is written to this register and may execute a function as a result. The memory device may therefore offer a technical advantage in that the accelerator may be invoked directly, rather than indirectly through various special-purpose commands.

Embodiments of the disclosure include a computational storage (CS) device that includes some or all of the following components: a storage component (such as a Non-Volatile Memory Express (NVMe) Solid State Drive (SSD)), a local memory (which may also be called a Peer-to-Peer (P2P) buffer), an accelerator, a light weight Peripheral Component Interconnect Express (PCIe)-to-PCIe Bridge (which may also be called a light weight bridge or LWB), and a device side cache-coherent interconnect interface.

The CS device may be exposed to the host CPU via two distinct interfaces. 1) NVMe block device; and 2) A cache-coherent interconnect protocol based .mem, .cache, and/or .io interface.

For the NVMe block interface, the traffic may be passed through the LWB. Host NVMe Read/Write commands may be sent to the SSD Controller, and SSD Controller Direct Memory Address (DMA) transactions may be forwarded to the Host.

For the cache-coherent interconnect interface, the CS device may expose .mem, .io, and .cache interfaces to the Host. The memory address range exposed to the host may be equal to, greater than, or smaller than the P2P buffer memory.

Host load/store memory accesses on cache-coherent interconnect .mem, and .cache interfaces may be served from the P2P buffer.

The LWB may use the cache-coherent interconnect .mem memory address range as a P2P buffer address range to filter the DMA transactions originating from the SSD Controller. That is to say, some DMA transactions may be diverted to the P2P buffer and rest may be forwarded to the host memory.

The LWB may perform the address filtering based on the cache-coherent interconnect .mem address ranges and forward the data accordingly.

The host CPU may also access the data in the P2P memory buffer via the CXL interface following CXL protocols.

The P2P buffer may reside in the CS device and may be exposed to the host processor with different cache-coherent interconnect protocols including .mem (type 3 device) and .cache (type 2 device).

The P2P buffer may be accessed by one or more accelerators residing in the CS device to process and/or transform and/or scan the data.

The accelerator may access the data residing in the P2P buffer directly.

In other embodiments of the disclosure, one or more accelerator may reside outside of CS device and may access the P2P buffer using the cache-coherent interconnect protocol.

Host NVMe Read/Write commands may have data source/destination addresses falling in the cache-coherent interconnect .mem address range (also known as the P2P address range).

The coherency of the data in the P2P buffer may be managed by the host software using a software-managed cache or using cache-coherent interconnect protocols.

The host may read/write data to the P2P region using file related functions (e.g., pread for read and pwrite for write).

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a device, comprising:

an interface to connect the device to a processor, the interface supporting a first protocol;

a first storage for a data;

a second storage for the data, the second storage supporting a second protocol;

a controller connected to the interface and the first storage; and a bridge connected to the interface, the first storage, and the second storage, the bridge including a filter configured to coordinate a data transfer between the first storage and the second storage, wherein the second protocol is different from the first protocol.

Statement 2. An embodiment of the disclosure includes the device according to statement 1, wherein the first protocol includes a cache-coherent interconnect protocol.

Statement 3. An embodiment of the disclosure includes the device according to statement 2, wherein the cache-coherent interconnect protocol includes a Compute Express Link (CXL) protocol.

Statement 4. An embodiment of the disclosure includes the device according to statement 1, wherein the second protocol includes a Non-Volatile Memory Express (NVMe) protocol.

Statement 5. An embodiment of the disclosure includes the device according to statement 1, wherein the first protocol includes a byte-level access protocol.

Statement 6. An embodiment of the disclosure includes the device according to statement 1, wherein the second protocol includes a block-level access protocol.

Statement 7. An embodiment of the disclosure includes the device according to statement 1, wherein the device is configured to advertise a capacity of the device as an extension of a memory associated with the processor.

Statement 8. An embodiment of the disclosure includes the device according to statement 7, wherein the capacity is smaller than, equal to, or greater than a size of the first storage.

Statement 9. An embodiment of the disclosure includes the device according to statement 1, further comprising an endpoint.

Statement 10. An embodiment of the disclosure includes the device according to statement 9, wherein the endpoint is configured to direct a first request type to the first storage and a second request type to the second storage.

Statement 11. An embodiment of the disclosure includes the device according to statement 1, wherein the controller is configured to manage access to the first storage.

Statement 12. An embodiment of the disclosure includes the device according to statement 1, wherein:

the first storage is associated with an address range;

a request includes an address in the address range; and the filter is configured to coordinate a data transfer between the address in the first storage and the second storage.

Statement 13. An embodiment of the disclosure includes the device according to statement 12, wherein the request includes a read request or a write request.

Statement 14. An embodiment of the disclosure includes the device according to statement 1, wherein:

a memory associated with the processor includes an address range;

a request includes an address in the address range; and the filter is configured to coordinate a data transfer between the address in the memory and the second storage.

Statement 15. An embodiment of the disclosure includes the device according to statement 14, wherein the request includes a read request or a write request.

Statement 16. An embodiment of the disclosure includes the device according to statement 1, further comprising an accelerator connected to the first storage.

Statement 17. An embodiment of the disclosure includes the device according to statement 16, wherein the accelerator is external to the device.

Statement 18. An embodiment of the disclosure includes the device according to statement 16, wherein the accelerator is configured to access the data from the first storage.

Statement 19. An embodiment of the disclosure includes the device according to statement 16, wherein the accelerator is associated with a register, wherein the processor may invoke a function of the accelerator by writing to the register.

Statement 20. An embodiment of the disclosure includes the device according to statement 19, wherein the accelerator is further associated with a second register, wherein the processor may determine a status of the accelerator by reading the second register.

Statement 21. An embodiment of the disclosure includes the device according to statement 20, wherein the first storage includes the second register.

Statement 22. An embodiment of the disclosure includes the device according to statement 20, wherein the accelerator includes a third storage, the third storage including the second register.

Statement 23. An embodiment of the disclosure includes the device according to statement 19, wherein the first storage includes the register.

Statement 24. An embodiment of the disclosure includes the device according to statement 19, wherein the accelerator includes a third storage, the third storage including the register.

Statement 25. An embodiment of the disclosure includes a method, comprising:

receiving a request from a processor at a device, the request using a first protocol;

determining a type of the request;

accessing a first storage of the device based at least in part on the type of the request including a first request type; and accessing a second storage of the device using a second protocol based at least in part on the type of the request including a second request type, wherein the second protocol is different from the first protocol.

Statement 26. An embodiment of the disclosure includes the method according to statement 25, wherein the first protocol includes a cache-coherent interconnect protocol.

Statement 27. An embodiment of the disclosure includes the method according to statement 26, wherein the cache-coherent interconnect protocol includes a Compute Express Link (CXL) protocol.

Statement 28. An embodiment of the disclosure includes the method according to statement 25, wherein the second protocol includes a Non-Volatile Memory Express (NVMe) protocol.

Statement 29. An embodiment of the disclosure includes the method according to statement 25, wherein the first protocol includes a byte-level access protocol.

Statement 30. An embodiment of the disclosure includes the method according to statement 25, wherein the second protocol includes a block-level access protocol.

Statement 31. An embodiment of the disclosure includes the method according to statement 25, further comprising advertising a capacity of the device as an extension of a memory associated with the processor.

Statement 32. An embodiment of the disclosure includes the method according to statement 31, wherein the capacity is smaller than, equal to, or greater than a size of the first storage.

Statement 33. An embodiment of the disclosure includes the method according to statement 25, wherein accessing the first storage of the device based at least in part on the type of the request including the first request type includes:

delivering the request to a controller associated with the first storage of the device; and accessing the first storage of the device using the controller.

Statement 34. An embodiment of the disclosure includes the method according to statement 25, wherein accessing the second storage of the device using the second protocol based at least in part on the type of the request including the second request type includes:

forwarding the request to a bridge of the device;

generating, at the bridge of the device, a second request using the second protocol based at least in part on the request using the first protocol; and delivering the second request using the second protocol type to the second storage of the device.

Statement 35. An embodiment of the disclosure includes the method according to statement 25, wherein the request includes a transfer request for the data between the second storage of the device and an address.

Statement 36. An embodiment of the disclosure includes the method according to statement 35, wherein accessing the second storage of the device using the second protocol based at least in part on the type of the request including the second request type includes:

determining that the address is in an address range associated with the first storage of the device; and transferring the data between the first storage of the device and the second storage of the device.

Statement 37. An embodiment of the disclosure includes the method according to statement 36, wherein determining that the address is in the address range associated with the first storage of the device includes determining, by a filter of a bridge, that the address is in the address range associated with the first storage of the device.

Statement 38. An embodiment of the disclosure includes the method according to statement 35, wherein accessing the second storage of the device using the second protocol based at least in part on the type of the request including the second request type includes:

determining that the address is in an address range associated with a memory associated with the processor; and transferring the data between the memory and the second storage of the device.

Statement 39. An embodiment of the disclosure includes the method according to statement 38, wherein determining that the address is in the address range associated with the memory associated with the processor includes determining, by a filter of a bridge, that the address is in the address range associated with the memory associated with the processor.

Statement 40. An embodiment of the disclosure includes the method according to statement 35, wherein the request includes a read request or a write request.

Statement 41. An embodiment of the disclosure includes the method according to statement 25, wherein:

the request using the first protocol includes the second request using the second protocol and a wrapper; and generating, at a bridge of the device, the second request using the second protocol based at least in part on the request using the first protocol includes removing the wrapper from the request using the first protocol.

Statement 42. An embodiment of the disclosure includes the method according to statement 25, wherein receiving the request from the processor at the device includes receiving the request from the processor at an endpoint of the device.

Statement 43. An embodiment of the disclosure includes the method according to statement 25, further comprising accessing the data from the first storage of the device by an accelerator.

Statement 44. An embodiment of the disclosure includes the method according to statement 43, further comprising receiving a second request from the processor at the device to execute a function of the accelerator on the data from the first storage of the device.

Statement 45. An embodiment of the disclosure includes the method according to statement 44, wherein receiving the second request from the processor at the device to execute the function of the accelerator includes receiving a write request to write a value into a register associated with the accelerator.

Statement 46. An embodiment of the disclosure includes the method according to statement 45, wherein receiving the write request to write the value into the register associated with the accelerator includes writing the value into the register.

Statement 47. An embodiment of the disclosure includes the method according to statement 46, wherein:

the first storage of the device includes the register; and writing the value into the register includes writing the value into the register in the first storage of the device.

Statement 48. An embodiment of the disclosure includes the method according to statement 46, wherein:

the accelerator includes a third storage, the third storage including the register; and writing the value into the register includes writing the value into the register in the third storage of the accelerator.

Statement 49. An embodiment of the disclosure includes the method according to statement 45, further comprising receiving a read request to read a second value from a second register associated with the accelerator to determine a status of the accelerator.

Statement 50. An embodiment of the disclosure includes the method according to statement 49, wherein receiving the read request to read the second value from the second register associated with the accelerator to determine the status of the accelerator includes reading the second value from the second register.

Statement 51. An embodiment of the disclosure includes the method according to statement 50, wherein:

the first storage of the device includes the second register; and reading the second value from the second register includes reading the second value from the second register in the first storage of the device.

Statement 52. An embodiment of the disclosure includes the method according to statement 50, wherein:

the accelerator includes a third storage, the third storage including the second register; and reading the second value from the second register includes reading the second value from the second register in the third storage of the accelerator.

Statement 53. An embodiment of the disclosure includes an article, comprising a non-transitory storage medium, the non-transitory storage medium having stored thereon instructions that, when executed by a machine, result in:

receiving a request from a processor at a device, the request using a first protocol;

determining a type of the request;

accessing a first storage of the device based at least in part on the type of the request including a first request type; and accessing a second storage of the device using a second protocol based at least in part on the type of the request including a second request type, wherein the second protocol is different from the first protocol.

Statement 54. An embodiment of the disclosure includes the article according to statement 53, wherein the first protocol includes a cache-coherent interconnect protocol.

Statement 55. An embodiment of the disclosure includes the article according to statement 54, wherein the cache-coherent interconnect protocol includes a Compute Express Link (CXL) protocol.

Statement 56. An embodiment of the disclosure includes the article according to statement 53, wherein the second protocol includes a Non-Volatile Memory Express (NVMe) protocol.

Statement 57. An embodiment of the disclosure includes the article according to statement 53, wherein the first protocol includes a byte-level access protocol.

Statement 58. An embodiment of the disclosure includes the article according to statement 53, wherein the second protocol includes a block-level access protocol.

Statement 59. An embodiment of the disclosure includes the article according to statement 53, the non-transitory storage medium having stored thereon further instructions that, when executed by the machine, result in advertising a capacity of the device as an extension of a memory associated with the processor.

Statement 60. An embodiment of the disclosure includes the article according to statement 59, wherein the capacity is smaller than, equal to, or greater than a size of the first storage.

Statement 61. An embodiment of the disclosure includes the article according to statement 53, wherein accessing the first storage of the device based at least in part on the type of the request including the first request type includes:

delivering the request to a controller associated with the first storage of the device; and accessing the first storage of the device using the controller.

Statement 62. An embodiment of the disclosure includes the article according to statement 53, wherein accessing the second storage of the device using the second protocol based at least in part on the type of the request including the second request type includes:

forwarding the request to a bridge of the device;

generating, at the bridge of the device, a second request using the second protocol based at least in part on the request using the first protocol; and delivering the second request using the second protocol type to the second storage of the device.

Statement 63. An embodiment of the disclosure includes the article according to statement 53, wherein the request includes a transfer request for the data between the second storage of the device and an address.

Statement 64. An embodiment of the disclosure includes the article according to statement 63, wherein accessing the second storage of the device using the second protocol based at least in part on the type of the request including the second request type includes:

determining that the address is in an address range associated with the first storage of the device; and transferring the data between the first storage of the device and the second storage of the device.

Statement 65. An embodiment of the disclosure includes the article according to statement 64, wherein determining that the address is in the address range associated with the first storage of the device includes determining, by a filter of a bridge, that the address is in the address range associated with the first storage of the device.

Statement 66. An embodiment of the disclosure includes the article according to statement 63, wherein accessing the second storage of the device using the second protocol based at least in part on the type of the request including the second request type includes:

determining that the address is in an address range associated with a memory associated with the processor; and transferring the data between the memory and the second storage of the device.

Statement 67. An embodiment of the disclosure includes the article according to statement 66, wherein determining that the address is in the address range associated with the memory associated with the processor includes determining, by a filter of a bridge, that the address is in the address range associated with the memory associated with the processor.

Statement 68. An embodiment of the disclosure includes the article according to statement 63, wherein the request includes a read request or a write request.

Statement 69. An embodiment of the disclosure includes the article according to statement 53, wherein:

the request using the first protocol includes the second request using the second protocol and a wrapper; and generating, at a bridge of the device, the second request using the second protocol based at least in part on the request using the first protocol includes removing the wrapper from the request using the first protocol.

Statement 70. An embodiment of the disclosure includes the article according to statement 53, wherein receiving the request from the processor at the device includes receiving the request from the processor at an endpoint of the device.

Statement 71. An embodiment of the disclosure includes the article according to statement 53, the non-transitory storage medium having stored thereon further instructions that, when executed by the machine, result in accessing the data from the first storage of the device by an accelerator.

Statement 72. An embodiment of the disclosure includes the article according to statement 71, the non-transitory storage medium having stored thereon further instructions that, when executed by the machine, result in receiving a second request from the processor at the device to execute a function of the accelerator on the data from the first storage of the device.

Statement 73. An embodiment of the disclosure includes the article according to statement 72, wherein receiving the second request from the processor at the device to execute the function of the accelerator includes receiving a write request to write a value into a register associated with the accelerator.

Statement 74. An embodiment of the disclosure includes the article according to statement 73, wherein receiving the write request to write the value into the register associated with the accelerator includes writing the value into the register.

Statement 75. An embodiment of the disclosure includes the article according to statement 74, wherein:

the first storage of the device includes the register; and writing the value into the register includes writing the value into the register in the first storage of the device.

Statement 76. An embodiment of the disclosure includes the article according to statement 74, wherein:

the accelerator includes a third storage, the third storage including the register; and writing the value into the register includes writing the value into the register in the third storage of the accelerator.

Statement 77. An embodiment of the disclosure includes the article according to statement 73, the non-transitory storage medium having stored thereon further instructions that, when executed by the machine, result in receiving a read request to read a second value from a second register associated with the accelerator to determine a status of the accelerator.

Statement 78. An embodiment of the disclosure includes the article according to statement 77, wherein receiving the read request to read the second value from the second register associated with the accelerator to determine the status of the accelerator includes reading the second value from the second register.

Statement 79. An embodiment of the disclosure includes the article according to statement 78, wherein:

the first storage of the device includes the second register; and reading the second value from the second register includes reading the second value from the second register in the first storage of the device.

Statement 80. An embodiment of the disclosure includes the article according to statement 78, wherein:

the accelerator includes a third storage, the third storage including the second register; and reading the second value from the second register includes reading the second value from the second register in the third storage of the accelerator.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A device, comprising:

an interface to connect the device to a processor, the interface supporting a first protocol;

a first storage for a data;

a second storage for the data, the second storage supporting a second protocol;

a controller connected to the interface and the first storage; and a bridge connected to the interface, the first storage, and the second storage, the bridge including a filter configured to coordinate a data transfer between the first storage and the second storage, wherein the device is configured to:

receive, from the processor, a first request using the first protocol;

forward the first request to the bridge of the device;

generate, at the bridge of the device, a second request using the second protocol based at least in part on the first request using the first protocol; and deliver the second request using the second protocol to the second storage of the device, wherein the second protocol is different from the first protocol.

2. The device according to claim 1, wherein:

the first protocol includes a cache-coherent interconnect protocol; and the second protocol includes a Non-Volatile Memory Express (NVMe) protocol.

3. The device according to claim 1, further comprising an endpoint configured to direct a first request type to the first storage and a second request type to the second storage.

4. The device according to claim 1, wherein:

the first storage is associated with an address range;

the first request includes an address in the address range; and the filter is configured to coordinate a data transfer between the address in the first storage and the second storage.

5. The device according to claim 1, further comprising an accelerator connected to the first storage, wherein the accelerator is associated with a register, wherein the processor may invoke a function of the accelerator by writing to the register.

6. The device according to claim 5, wherein the accelerator is further associated with a second register, wherein the processor may determine a status of the accelerator by reading the second register.

7. The device according to claim 1, wherein:

the bridge is connected to the interface, the first storage, and the second storage; and the bridge includes the filter.

8. A method, comprising:

receiving a first request from a processor at a device, the first request using a first protocol;

determining a type of the first request;

accessing a first storage of the device based at least in part on the first request including a first request type; and accessing a second storage of the device using a second protocol based at least in part on the type of the first request including a second request type, wherein accessing the second storage of the device using the second protocol includes:

forwarding the first request to a bridge of the device;

generating, at the bridge of the device, a second request using the second protocol based at least in part on the first request using the first protocol; and delivering the second request using the second protocol to the second storage of the device, wherein the second protocol is different from the first protocol.

9. The method according to claim 8, further comprising advertising a capacity of the device as an extension of a memory associated with the processor.

10. The method according to claim 8, wherein the first request includes a transfer request for a data between the second storage of the device and an address.

11. The method according to claim 10, wherein accessing the second storage of the device using the second protocol based at least in part on the type of the first request including the second request type includes:

determining that the address is in an address range associated with the first storage of the device; and transferring the data between the first storage of the device and the second storage of the device.

12. The method according to claim 8, wherein:

the first request using the first protocol includes the second request using the second protocol and a wrapper; and generating, at the bridge of the device, the second request using the second protocol based at least in part on the first request using the first protocol includes removing the wrapper from the first request using the first protocol.

13. The method according to claim 8, further comprising receiving a third request from the processor at the device to execute a function of an accelerator on a data from the first storage of the device.

14. The method according to claim 13, wherein receiving the third request from the processor at the device to execute the function of the accelerator includes:

receiving a write request to write a value into a register associated with the accelerator; and writing the value into the register.

15. The method according to claim 14, further comprising receiving a read request to read a second value from a second register associated with the accelerator to determine a status of the accelerator.

16. An article, comprising a non-transitory storage medium, the non-transitory storage medium having stored thereon instructions that, when executed by a machine, result in:

receiving a first request from a processor at a device, the first request using a first protocol;

determining a type of the request;

accessing a first storage of the device based at least in part on the type of the request including a first request type; and accessing a second storage of the device using a second protocol based at least in part on the type of the request including a second request type, wherein accessing the second storage of the device using the second protocol includes:

forwarding the first request to a bridge of the device;

generating, at the bridge of the device, a second request using the second protocol based at least in part on the first request using the first protocol; and delivering the second request using the second protocol to the second storage of the device, wherein the second protocol is different from the first protocol.

17. The article according to claim 16, wherein the first request includes a transfer request for a data between the second storage of the device and an address.

18. The article according to claim 17, wherein accessing the second storage of the device using the second protocol based at least in part on the first request including the second request type includes:

determining that the address is in an address range associated with the first storage of the device; and transferring the data between the first storage of the device and the second storage of the device.

* * * * *